US006957388B1

(12) United States Patent
Taguchi et al.

(10) Patent No.: US 6,957,388 B1
(45) Date of Patent: Oct. 18, 2005

(54) SCENARIO EDITING DEVICE CAPABLE OF AUTOMATICALLY SUPPLEMENTING SCENARIO ON THE BASIS OF RECEIVED ADDITIONAL DATA

(75) Inventors: Daigo Taguchi, Tokyo (JP); Hisashi Noda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/520,240

(22) Filed: Mar. 7, 2000

(30) Foreign Application Priority Data

Mar. 8, 1999 (JP) .................................. 11-60371

(51) Int. Cl.[7] .............................................. G09G 5/00
(52) U.S. Cl. ..................... 715/723; 715/731; 715/744; 715/515; 715/530; 707/101; 707/104.1
(58) Field of Search ............................... 345/723, 724, 345/730, 731, 732; 715/530, 540, 500.1, 715/513, 723, 731, 744, 515; 706/47, 46, 706/50, 55, 56; 707/101, 104.1

(56) References Cited

U.S. PATENT DOCUMENTS 5,675,752 A * 10/1997 Scott et al. .................. 345/744
5,969,716 A * 10/1999 Davis et al. ................. 345/723

FOREIGN PATENT DOCUMENTS

| JP | 7021352 | 1/1995 |
| JP | 09-134340 | 5/1997 |
| JP | 9-171450 | 6/1997 |
| JP | 10-254958 | 9/1998 |

* cited by examiner

Primary Examiner—Ba Huynh
(74) Attorney, Agent, or Firm—Foley & Lardner LLP

(57) ABSTRACT

A scenario editing device comprises a scenario supplementing unit supplements a scenario memorized in a scenario memory according to a scenario basic rule memorized in a scenario rule memory when it receives additional data set from a receiving unit. The scenario supplementing unit includes a material represented by the additional data set with multimedia contents to make the multimedia contents approach a complete state. To receive the additional data set at the receiving unit, the scenario editing device exhibits the multimedia contents with a incomplete state on a computer network.

18 Claims, 12 Drawing Sheets

FIG. 6A

MAIN TABLE

| NAME OF PAGE | NO. OF DATA TABLE |
|---|---|
| TABLE OF CONTENTS | 001 |
| SPOT C, 1980 | 002 |

FIG. 6B

DATA TABLE 001

| NAME OF DATA | WIDTH | HEIGHT | HORIZONTAL POSITION | VERTICAL POSITION | DISPLAY START TIME | DISPLAY END TIME | TYPE | DETAILS |
|---|---|---|---|---|---|---|---|---|
| TEXT001 | 20 | 10 | 0 | 0 | 0 | ∞ | TEXT | TABLE OF CONTENTS |
| IMAGE001 | 120 | 65 | 5 | 5 | 1 | ∞ | IMAGE | C:¥Table.jpg |
| BUTTON001 | 15 | 8 | 90 | 40 | 1 | ∞ | BUTTON | LINK TO PAGE SPOT C 1980 |

FIG. 6C

DATA TABLE 002

| NAME OF DATA | WIDTH | HEIGHT | HORIZONTAL POSITION | VERTICAL POSITION | DISPLAY START TIME | DISPLAY END TIME | TYPE | DETAILS |
|---|---|---|---|---|---|---|---|---|
| TEXT001 | 80 | 10 | 0 | 0 | 0 | ∞ | TEXT | SPOT C, 1980 |
| IMAGE001 | 60 | 40 | 10 | 20 | 1 | ∞ | IMAGE | C:¥19870-C.jpg |
| TEXT002 | 50 | 40 | 80 | 20 | 2 | ∞ | TEXT | PEACEFUL AND RURAL LANDSCAPE HAD BEEN SEEN. ... |

| TABLE OF CONTENTS | PRODUCED BY OPERATOR |
|---|---|
| THE NUMBER OF PAGES | EXCEPT FOR "TABLE OF CONTENTS" |
| CONSTRUCTION | *MAKE A CONTENT PAGE EVERY CONBINATION OF SPOT AND YEAR<br>*FOLLOW THE PAGE OF "SPOT C, 1980" |
| LINK TO "TABLE OF CONTENTS" | *CLASSIFY RECEIVED DATA ACCORDING TO YEARS OF 1970,1980,1990, & 2000<br>*CLASSIFY RECEIVED DATA ACCORDING TO SPOTS OF A, B, C, & D<br>*LOCATE A BUTTON ACCORDING TO EQUATION F<br>BUTTON POSITION=F(i,j)<br>i=SPOT A, B, C, &D<br>j=1970, 1980,1990, & 2000 |
| ⋮ | ⋮ |

FIG. 7

| LACKING PAGE | SPOT A, 1970  SPOT B, 1970  SPOT C, 1970  SPOT D, 1970<br>SPOT A, 1980  SPOT B, 1980                               SPOT D, 1980<br>SPOT A, 1990  SPOT B, 1990  SPOT C, 1990  SPOT D, 1990<br>SPOT D, 2000  SPOT B, 2000  SPOT C, 2000  SPOT D, 2000 |
|---|---|
| COMPLETE RATE | 1/16 |
| ⋮ | |

FIG. 8

| NAME OF SUPPLYER | E-MAIL ADDRESS | DATE OF SUPPLY | SUPPLIED INFORMATION |
|---|---|---|---|
| YAMAMOTO HANAKO | Hanako@ ddd.eee.fff | 1998/12/10 | AUDIO, IMAGE |
| NICHIDEN TARO | Taro@ aaa.bbb.ccc | 1998/12/20 | AUDIO, TEXT |
|  |  |  |  |

FIG. 11

MAIN TABLE

| NAME OF PAGE | NO. OF DATA TABLE |
|---|---|
| TABLE OF CONTENTS | 001 |
| SPOT C, 1980 | 002 |
| SPOT A, 1990 | 003 |

FIG. 12A

DATA TABLE 001

| NAME OF DATA | WIDTH | HEIGHT | HORIZONTAL POSITION | VERTICAL POSITION | DISPLAY START TIME | DISPLAY END TIME | TYPE | DETAILS |
|---|---|---|---|---|---|---|---|---|
| TEXT001 | 20 | 10 | 0 | 0 | 0 | ∞ | TEXT | TABLE OF CONTENTS |
| IMAGE001 | 120 | 65 | 5 | 5 | 1 | ∞ | IMAGE | C:¥MAP.Jpg |
| BUTTON001 | 15 | 8 | 90 | 40 | 1 | ∞ | BUTTON | LINK TO PAGE SPOT C, 1980 |
| BUTTON002 | 15 | 8 | 40 | 50 | 1 | ∞ | BUTTON | LINK TO PAGE SPOT A, 1990 |

FIG. 12B

DATA TABLE 002

| NAME OF DATA | WIDTH | HEIGHT | HORIZONTAL POSITION | VERTICAL POSITION | DISPLAY START TIME | DISPLAY END TIME | TYPE | DETAILS |
|---|---|---|---|---|---|---|---|---|
| TEXT001 | 80 | 10 | 0 | 0 | 0 | ∞ | TEXT | SPOT C, 1980 |
| IMAGE001 | 60 | 40 | 10 | 20 | 1 | ∞ | IMAGE | C:¥1980-C.Jpg |
| TEXT002 | 50 | 40 | 80 | 20 | 2 | ∞ | TEXT | PEACEFUL RURAL LANDSCAPE HAD BEEN SEEN |

FIG. 12C

DATA TABLE 003

| NAME OF DATA | WIDTH | HEIGHT | HORIZONTAL POSITION | VERTICAL POSITION | DISPLAY START TIME | DISPLAY END TIME | TYPE | DETAILS |
|---|---|---|---|---|---|---|---|---|
| TEXT001 | 80 | 10 | 0 | 0 | 0 | ∞ | TEXT | SPOT A, 1990 |
| IMAGE001 | 60 | 40 | 10 | 20 | 1 | ∞ | IMAGE | C:¥1990-A.Jpg |
| TEXT002 | 50 | 40 | 80 | 20 | 2 | ∞ | TEXT | LARGE BUILDINGS ARE SEEMINGLY INCREASING IN THOSE DAYS |

FIG. 12D

| LACKING PAGES | SPOT A, 1970 | SPOT B, 1970 | SPOT C, 1970 | SPOT D, 1970 |
| --- | --- | --- | --- | --- |
| | SPOT A, 1980 | SPOT B, 1980 | | SPOT D, 1980 |
| | | SPOT B, 1990 | SPOT C, 1990 | SPOT D, 1990 |
| | SPOT A, 2000 | SPOT B, 2000 | SPOT C, 2000 | SPOT D, 2000 |
| SCENARIO COMPLETE RATE | 2/16 | | | |
| ⋮ | | | | |
| ⋮ | | | | |
FIG. 13
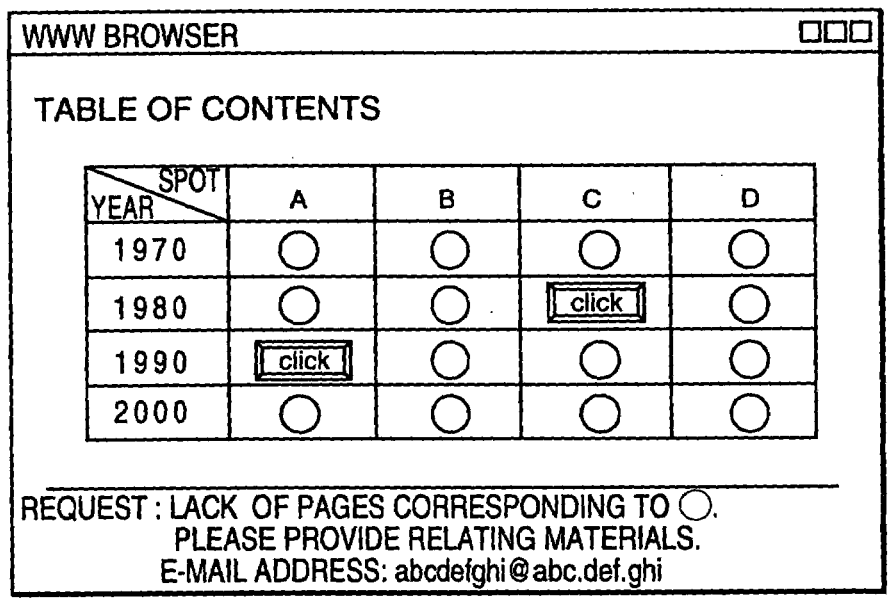
FIG. 14A
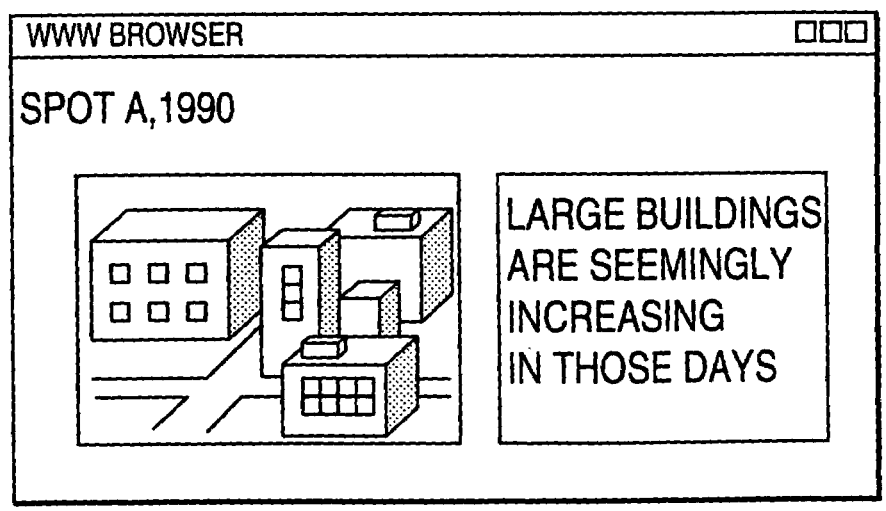
FIG. 14A

SCENARIO EDITING DEVICE CAPABLE OF AUTOMATICALLY SUPPLEMENTING SCENARIO ON THE BASIS OF RECEIVED ADDITIONAL DATA

BACKGROUND OF THE INVENTION

This invention relates to a scenario editing device which is for editing a scenario of multimedia contents.

The multimedia contents include a plurality of material represented by multimedia data. The multimedia data includes at least one data set such as an image data set (or still picture data set), a video data set (or moving picture data set or animation data set), an audio data sat, or a text data set. A scenario defines a concrete form or presenting or exhibiting the multimedia contents. In other words, the scenario defines displaying position and timing of text and images and reproducing audio and video. The multimedia contents is provided to a computer with a recording medium much as a CD-ROM or through a computer network such as an internet. Then, the multimedia contents is presented or exhibit to clients with the computer.

As is easily understood from the description mentioned above, the scenario is necessary to present or exhibit the multimedia contents to the clients.

A conventional scenario editing device produces and edits the scenario in response to instructions given by an operator.

The operator prepares multimedia data to complete the multimedia contents and produce the scenario so that the prepared multimedia data is included in the multimedia contents.

It is desired to automatically supplement a scenario of incomplete multimedia contents when the scenario editing device receives additional multimedia data, which are necessary to complete an incomplete multimedia contents.

However, the conventional scenario editing device can not automatically supplement the scenario of the multimedia contents on the basis of the additional multimedia data because it needs instructions given by the operator to supplement (or edit) the scenario.

SUMMARY OF THE INVENTION

It is therefore an object of this invention to provide a scenario editing device which can automatically supplement a scenario of multimedia contents when it receives an additional data not which is necessary to complete the multimedia contents.

Other objects of this invention will become clear as the description proceeds. From this description, it is possible to understand that a scenario editing device edits a scenario of multimedia contents, which include a plurality of materials represented by data sets.

According to an aspect of the invention, the scenario editing device comprises a scenario memory for memorizing the scenario. A scenario rule memory memorizes a scenario basic rule which defines specifications of a complete state of the multimedia contents. A receiving unit receives an additional data set, which represents additional material necessary to complete the multimedia contents. A scenario supplementing unit is connected to the scenario memory, the scenario rule memory, and the receiving unit and supplements the scenario according to the scenario basic rule so that the additional material is included in the multimedia contents to make the multimedia contents approach the complete state.

According to another aspect of this invention, a scenario editing device edits a scenario of multimedia contents, which are presented to a client through a computer network and which include a plurality of materials represented by data sets. The scenario editing device comprises a scenario memory for memorizing the scenario. A presenting section is connected to the scenario memory and the computer network and presents the multimedia contents to the client by the use of the scenario memorized in scenario memory. A receiving unit receives an additional data set which is supplied from the client and which represents an additional material. A scenario supplementing unit is connected to the scenario memory and the receiving unit for supplementing the scenario memorized in the scenario memory so that the additional material represented by the additional data set is included in the multimedia contents.

According to still another aspect of this invention, a recording medium in which a computer readable program is recorded. The computer readable program comprises the steps of memorizing, in a scenario memory, a scenario of multimedia contents which include a plurality of materials represented by data sets, memorizing, in a scenario rule memory, a scenario basic rule which defines specifications of a complete state of the multimedia contents, receiving, by a receiving unit, an additional data set which represents an additional material necessary to complete the multimedia contents, and supplementing, at a scenario supplementing unit, the scenario according to the scenario basic rule so that the additional material is included in the multimedia contents to make the multimedia contents approach the complete state.

BRIEF DESCRIPTION OF THE DRAWINGS

FIGS. 6A, 6B, and 6C show a form of a scenario memorized in a scenario memory;

FIG. 7 shows a form of a scenario basic rule memorized in scenario rule memory;

FIG. 8 shows a form of a scenario complete degree information;

FIG. 11 show a form of a supplier information memorized in supplier information memory;

FIGS. 12A, 12B, 12C, and 12D show an examples of supplemented scenario;

FIG. 13 shows a renewed scenario complete degree information; and

FIGS. 14A and 14B show supplemented multimedia contents .

DESCRIPTION OF THE PREFERRED EMBODIMENT

Figure 1:
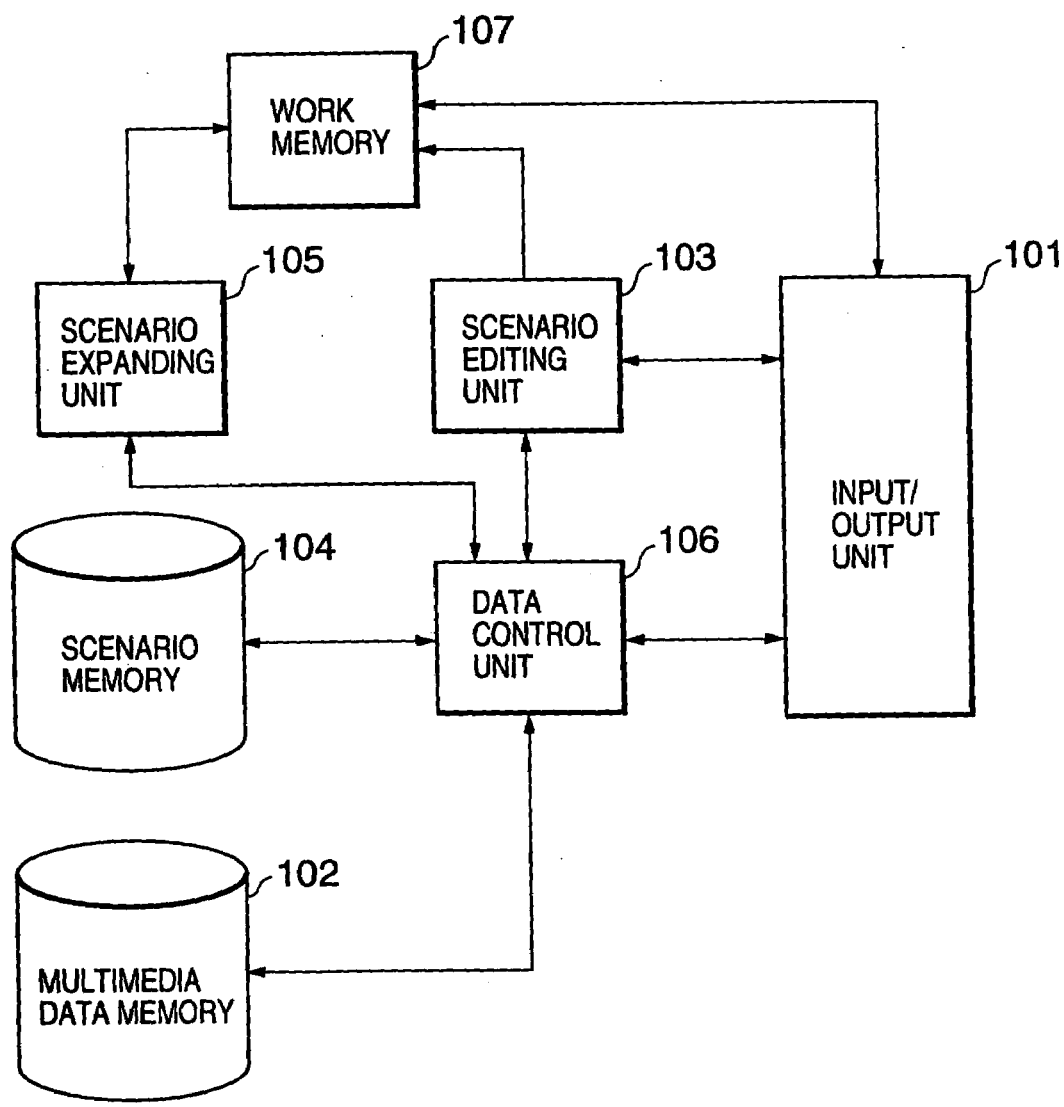
FIG. 1 is a block diagram of a conventional scenario editing device.
Figure 2:
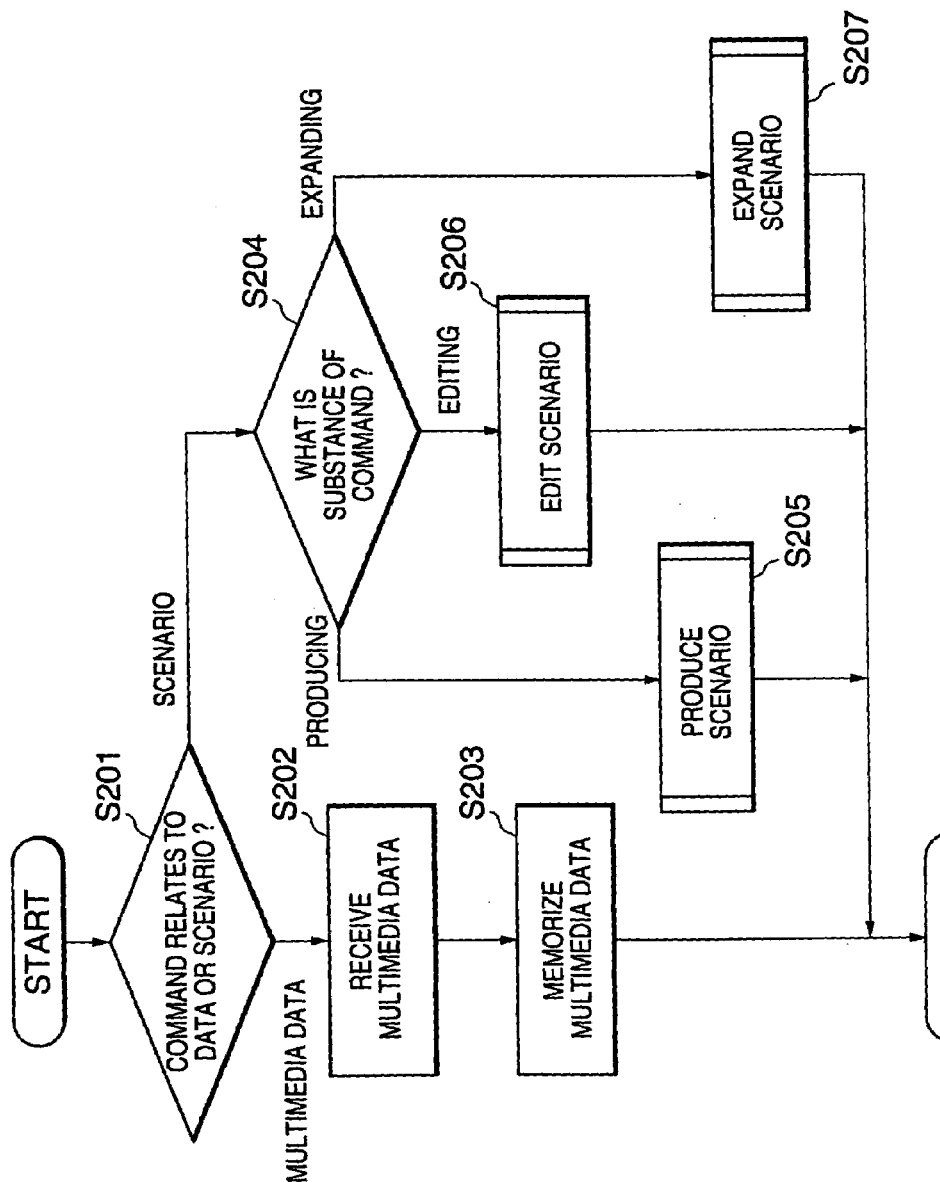
FIG. 2 is a flow chart for describing an operation of the conventional scenario editing device of FIG. 1.

Referring to FIGS. 1 and 2, description will be at first directed to a conventional scenario editing device for a better understanding of this invention. The scenario editing device is used for producing and editing a scenario, which defines presenting positions and timing of multimedia contents formed by materials represented by multimedia data in response to instructions given by an operator.

In FIG. 1, the conventional scenario editing device comprises an input/output unit 101, which receives commands and multimedia data from the operator. The multimedia data are, for example, image data sets, video data sets, text data sets, and audio data sets. The commands are used to give instruction to the scenario editing device. A multimedia data memory 102 memorizes the multimedia data. A scenario editing unit 105 produces and edits the scenario on the basis of the multimedia data in response to the commands. A scenario memory 104 memorizes the scenario. A scenario expanding unit 105 expands the scenario, which includes a sub-scenario to edit the scenario. A data control unit 106 is connected to the input/output unit 101, the multimedia data memory 102, the scenario editing unit 103, the scenario memory 104, and the scenario expanding unit 105 to control flows of the commands, the multimedia data and the scenario. A work memory 107 is connected to the scenario editing unit 103, the scenario expanding unit 105, and the input/output unit 101 to temporarily store the scenario.

The scenario editing device operates as shown in FIG. 2 when a command is supplied from the operator to the input/output unit 101.

At the step S201, the input/output unit 101 decides whether the received command relates to the multimedia data or the scenario. When the received command relates to the multimedia data, the input/output unit 101 receives the multimedia data from the operator at the step S202 and transmits the multimedia data to the multimedia data memory 102 through the data control unit 106. The multimedia data memory 102 memorizes the multimedia data transmitted from the input/output unit 103 at the step S203.

On the other hand, when the received command relates to the scenario, the input/output unit 101 judges the substance of the received command at the step S204.

If the received command instructs the scenario editing device, to produce the scenario, the, input/output unit 102 orders the data control unit 106 and the scenario editing unit 103 to produce the scenario. When the data control unit 106 receives the scenario producing order from the input/output unit 101, it reads out the multimedia data from the multimedia data memory 102 and transmits the multimedia data to the scenario editing unit 103 . The scenario editing unit 103 receives the multimedia data from the data control unit 106 and produces the scenario at the step S205. In this event, the scenario editing unit 103 receives the commands given from the operator through the input/output unit 101. Then, the scenario editing unit 103 transmits the produced scenario to the scenario memory 104 through the data control unit 106. The scenario memory 104 memorizes the produced scenario supplied from the scenario editing unit 103.

If the received command instructs the scenario editing device to edit the scenario memorized in the scenario memory 104, the input/output unit 101 orders the data control unit 106 and the scenario editing unit 103 to edit the scenario. When the data control unit 106 receives the scenario editing order from the input/output unit 101, it reads out the scenario from the scenario memory 104 and transmits the scenario to the scenario editing unit 103. The scenario editing unit 103 receives the scenario from the data control unit 106 and edits the scenario in response to the commands given by the operator at the step S206. Then, the scenario editing unit 103 transmits the edited scenario to the scenario memory 104 through the data control unit 106. The scenario memory 104 memorizes the edited scenario.

If the received command instructs the scenario editing device to expand the scenario memorized in the scenario memory 104, the input/output unit 101 orders the data control unit 106 to expand the scenario. When the data control unit 106 receives the scenario expanding order from the input/output unit 101, it reads out the scenario from the scenario memory 104 and transmits the scenario to the scenario expanding unit 105. The scenario expanding unit 105 receives the scenario from the data control unit 106 and expands the scenario at the step S207. Then, the scenario expanding unit 105 stores the expanded scenario into the work memory 107. The scenario editing unit 103 can edit the expanded scenario stored in the work memory 107.

As mentioned above, the conventional scenario editing device produces and edits the scenario on the basis of the previously provided multimedia data in response to the commands supplied from the operator. Such a scenario editing device is disclosed in Japanese Unexamined Patent Publication (JP-A) No. 8-305720.

It is desired to automatically edit or supplement the scenario of multimedia contents when the scenario editing device receives additional multimedia data, which is necessary to complete the multimedia contents. For example, a teacher may presents or exhibits incomplete multimedia contents to his/her students using a temporary scenario through a computer network and requests students to supply the additional multimedia data for completing the multimedia contents. In this case, the teacher desires that the scenario editing device can automatically supplement the temporary scenario on the basis of the additional multimedia data.

However, the conventional scenario editing device needs the commands from the operator to receive the additional multimedia data and to edit the scenario. That is, the conventional scenario editing device does not have a setting section for supplementing information that is necessary to automatically supplement the scenario, a list producing section for producing a lacking multimedia data list on the basis of the supplement information, a presenting section for presenting the incomplete multimedia contents to clients, a scenario supplementing section for receiving the additional multimedia data provided by the clients and for completing the scenario on the basis of the additional multimedia data and the supplement information, and a contents completing section for changing the incomplete multimedia contents into complete multimedia contents.

Referring to FIGS. 3 through 14, the description will proceed to a scenario editing device according to a preferred embodiment of this invention. The scenario editing device is realized with, for example, a personal computer which is connected to a computer network such as an internet. In other words, the scenario editing device is realized a program which can be read and executed by the personal computer.

Figure 3:
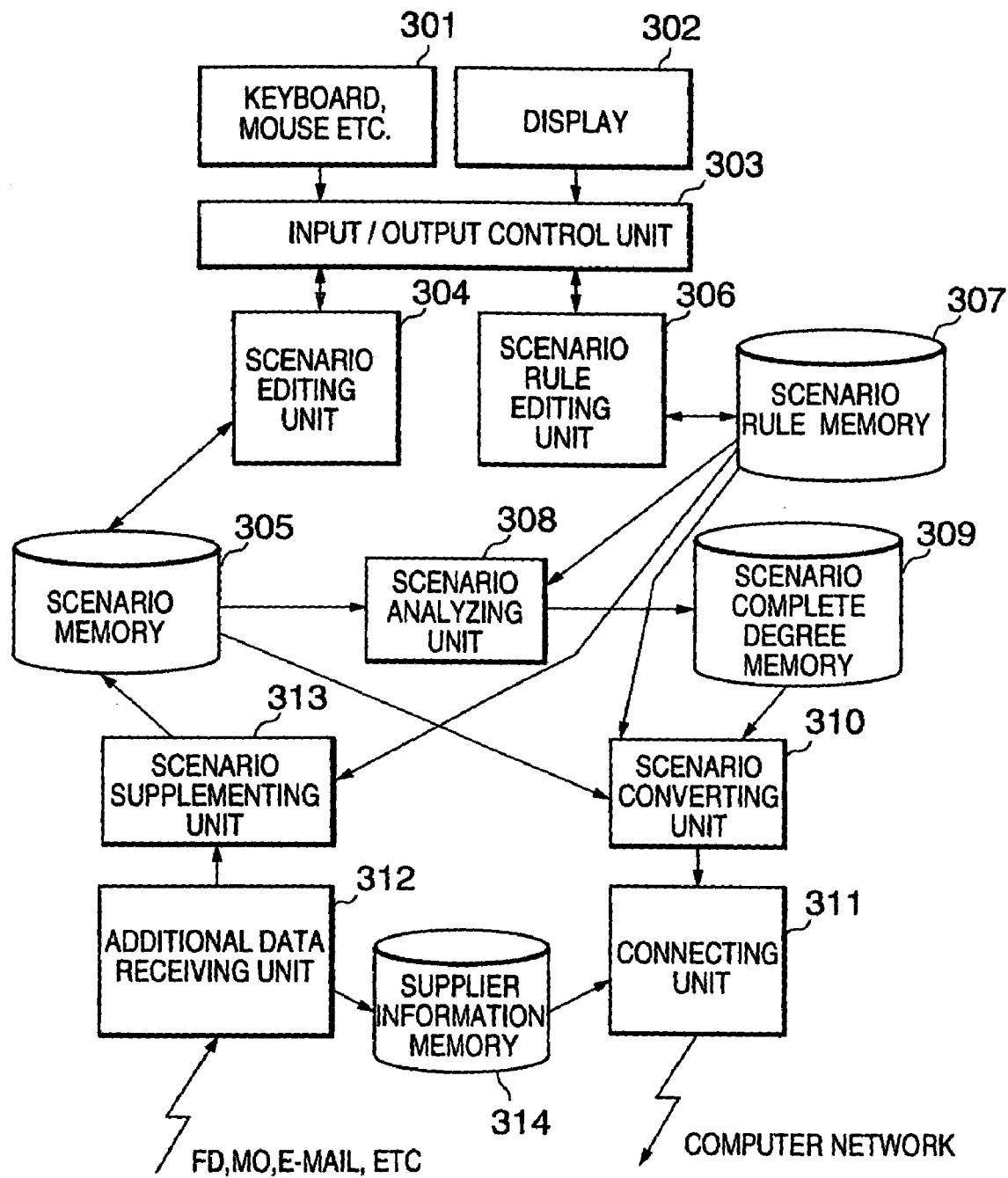
FIG. 3 is a block diagram of a scenario editing device of a preferred embodiment of this invention.

In FIG. 3, the scenario editing device comprises an input device 301. The input device is, for example, a keyboard or a mouse. The input device may be a combination of the keyboard, the mouse, and so on. The input device 301 is operated by an operator to input commands. The commands instructs the scenario editing device to receive multimedia data representative of materials of multimedia contents, to delete disused multimedia data, and to designate presenting or exhibiting positions and timing of the materials. The multimedia data includes an audio data set, a video data set, an image date set, and a text data set. An output device 302 is, for example, a display unit and displays the multimedia data, the multimedia contents, and necessary information for the inputting operation for the input device 201. An input/output control unit 303 is connected to the input device 301 and the output device 302 to control signals supplied from the input device 301 and other signals supplied to the output device 302. When the input/output control unit 303 receives the commands from the input device 301, it produces operating information. A scenario editing unit 304 is connected to the input/output control unit 303 to produce and edit a scenario of the multimedia contents on the basis of the operating information supplied from the input/output control unit 303. A scenario memory 305 is connected to the scenario editing unit 304 to memorize the scenario produced and edited by the scenario editing unit 304 together with the multimedia data relating to the scenario. A scenario rule editing unit 306 is connected to the input/output control unit 303 to produce and edit a scenario basic rule on the basis of the operating information supplied from the input/output control unit 303. The scenario basic rule is used for automatically supplementing the scenario. A scenario rule memory 307 is connected to the scenario rule editing unit 306 to memorizes the scenario basic rule produced and edited by the scenario rule editing unit 306. A scenario analyzing unit 308 is connected to the scenario memory 305 and the scenario rule memory 307 and analyzes the scenario memorized in the scenario memory 305 with referring to the scenario basic rule memorized in the scenario memory 307 to produce a scenario complete degree information. The scenario complete degree information includes a scenario complete rate information representation of a complete rate of the multimedia contents and a locking data list representative of locking data sets for a complete state of the multimedia contents. A scenario complete degree memory 309 is connected to the scenario analyzing unit 308 to memorize the scenario complete degree information. A scenario converting unit 310 is connected to the scenario memory 305, the scenario rule memory 307, and the scenario complete degree memory 309. The scenario converting unit 310 converts the scenario memorized in the scenario memory 305 into an exhibiting electronic document with referring to the scenario basic rule memorized in the scenario memory 307 to exhibit an incomplete multimedia contents. The incomplete multimedia contents includes the scenario complete degree information memorized in the scenario complete degree memory 309. A connecting unit 311 is connected to the scenario converting unit 310 and the computer network and exhibits the incomplete multimedia contents on the computer network to present the incomplete multimedia contents to clients through the computer network. The scenario converting unit 310 and the connecting unit 311 are called a presenting section for presenting the multimedia contents to the clients. An additional data receiving unit 312 is for receiving an additional data set and supplier information from the clients. The additional data receiving unit 312 includes, for example, a small receiving client software, a floppy disk drive for a floppy or flexible magnetic disk, an optical disk drive for an optical disk or a optical magnetic disk, a memory reader for a semiconductor memory, a modem or a terminal adapter connected to the computer network, or a scanner for scanning a printed matter. A scenario supplementing unit 313 is connected to the scenario memory 305, the scenario sole memory 307, and the additional data receiving unit 312 and produces an additional scenario according to the scenario basic rule memorized in scenario rule memory 307 and the additional data set received by the additional data receiving unit 312 to supplement the scenario memorized in the scenario memory 305 with the additional scenario. Moreover, the scenario supplementing unit 313 adds the additional data set received by the additional data receiving unit 312 to the multimedia data memorized in the scenario memory 305. An supplier information memory 314 is connected to the additional data receiving unit 312 and the connecting unit 311 and memorized the supplier information received by the additional data receiving unit 312 to supply the supplier information to the connecting unit 311.

An operation of the scenario editing device is described soon with referring to FIGS. 4 to 14 together with FIG. 3.

Figures 4A, 4B:
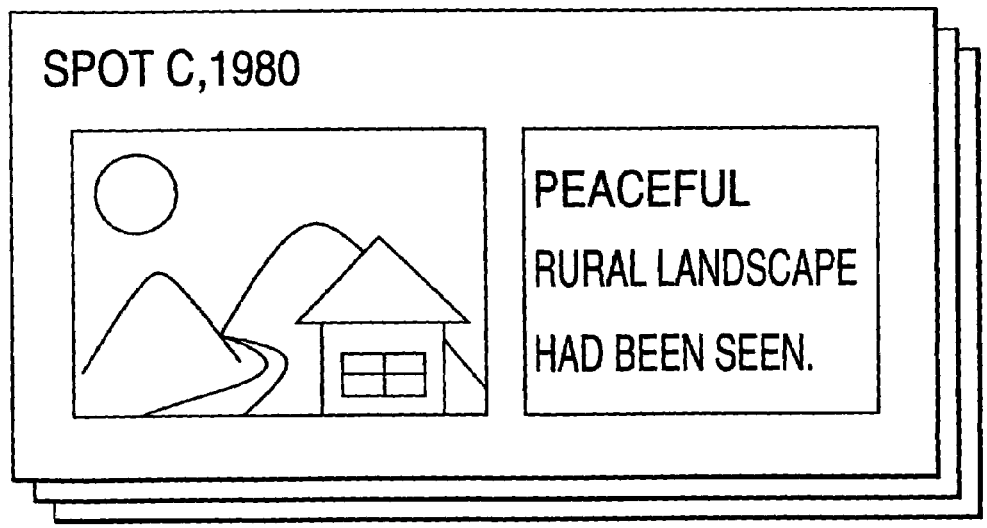
FIGS. 4A and 4B show an example of a complete state of multimedia contents.

At first, the operator makes a concrete idea of the complete state of the multimedia contents as illustrated in FIGS. 4A and 4B. The multimedia contents includes a table of contents shown in FIG. 4A and content pages shown in FIG. 4B. The table of FIG. 4A has items or spots of A, B, C, and D and years of 1970, 1980, 1990, and 2000. The table includes link buttons corresponding to combinations of points and years. Each of the link buttons is related to one of the content pages of FIG. 4B. Each of the content pages includes a title, a picture, and a caption.

Next, the operator makes temporary multimedia contents, which lacks a part of the materials of the complete multimedia contents. When all of the materials is not gathered, the operator makes the temporary multimedia contents. Moreover, the operator makes the temporary multimedia contents so that the clients tries to gather the lacking materials.

To make the temporary multimedia contents, the operator operates the input device. 301. The operator inputs the multimedia data representative of provided materials and instructs presenting position and timing by the use of input device 301. The input device 301 supplies the multimedia data and commands corresponding to the instructions.

The input/output control unit 303 produces the operating information in response the commands supplied from the input device 301 and supplies the operating information to the scenario editing unit 304.

The scenario editing unit 304 produces the scenario for the temporary multimedia contents and stores the scenario into the scenario memory 305.

Figures 5A, 5B:
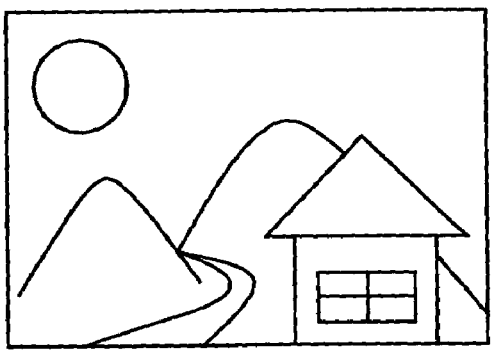
FIGS. 5A and 5B show an example of an incomplete multimedia contents.

An example of the temporary multimedia contents is shown in FIGS. 5A and 5B. Namely, the temporary multimedia contents includes a table of contents shown in FIG. 5A and a content page shown in FIG. 5B. The table of FIG. 5A has an only one link button which is related to the content page of FIG. 5B. In this case, the scenario memory memorizes the scenario of the form as shown in FIGS. 6A, 6B, and 6C. That is, the scenario has a main table shown in FIG. 6A and two data tables shown in FIGS. 6B and 6C. The data table 001 of FIG. 6A is corresponding to the table of the contents of FIG. 5A while the data table 002 of FIG. 6B is corresponding to the content page of FIG. 5B.

Next, the operator inputs necessary information for making the scenario basic rule at the scenario rule editing unit 306. The scenario rule editing unit 306 receives the information from the input device 301 through the input/output control unit 303 and produce the scenario basic rule. The scenario rule memory 307 memorizes the scenario basic rule made by the scenario rule editing unit 306.

The scenario basic rule includes rules of, for example, "The number of the content pages are sixteen in the complete state.", "The content pages are classified on the basis of combinations of spots and years", "Positions of the link bottoms are decided by an equation F.", etc. For example, the scenario basic rule memorized in the scenario rule memory 307 has a form as shown in FIG. 7. Additionally, the scenario basic rule may be written with script language (i.e. simple programming language, e.g. JavaScript) which can be handled by the scenario analyzing unit 308, the scenario converting unit 310, and scenario supplementing unit 313. If the scenario basic rule includes enough substance to form the scenario for the complete multimedia contents, it is unnecessary for the operator to make the temporally multimedia contents.

When the scenario basic rule memorized in the scenario rule memory 307, the scenario analyzing unit 308 reads out the scenario from the scenario memory 305. Then the scenario analyzing 308 recognizes that the scenario memorized in the scenario memory 305 includes pages of "TABLE OF CONTENTS" and "SPOT C, 1980". Moreover, the scenario analyzing 308 reads out the scenario basic rule from the scenario memory 307 and produces the scenario complete degree information on the basis of the scenario with referring to the scenario basic rule. The scenario complete degree information is, for example, as shown in FIG. 8 . In FIG. 8, the leaking data list shows lack of fifteen pages. The scenario complete rate information shows that one sixteenth of the multimedia contents is finished.

When the scenario complete degree information is stored in the scenario complete degree memory 309, the scenario converting unit 310 reads out the scenario from the scenario memory 309 and recognizes that the data table 001 corresponds to the scenario or the table of the contents on the basis of the main table of FIG. 6A. Furthermore, the scenario converting unit 310 roads out the scenario complete degree information from the scenario complete degree memory 309 and specifies the lacking pagan on the basis of the lacking data list included in the scenario complete degree information. In addition, the scenario converting unit 310 reads out the scenario basic rule from the scenario rule memory 307 and recognizes locations of the link buttons relating to the lacking pages. Then the scenario converting unit 310 changes the scenario so that marks such as open circles are located in place of the link buttons corresponding to the lacking page. The scenario converting unit 310 further changes the scenario so that a request sentence is included in the page of the title or the contents. The request sentence is, for example, "REQUEST: Lack or pages corresponding to Open Circles. Please provide relating materials." Than the scenario converting unit 310 converts the scenario into the exhibiting electronic document such as a HTML (Hyper Text Markup Language) document. The exhibiting electronic document includes materials represented by the test data sets. The exhibiting electronic document and multimedia data except for the text data sets are supplied to the connecting unit 311.

The connecting unit 311 is, for example, a modem and uploads the exhibiting electronic document and the multimedia data to, for example, a WWW server connected to the internet. Thus the multimedia contents exhibits on the computer network and present them to the clients.

Figure 9A:
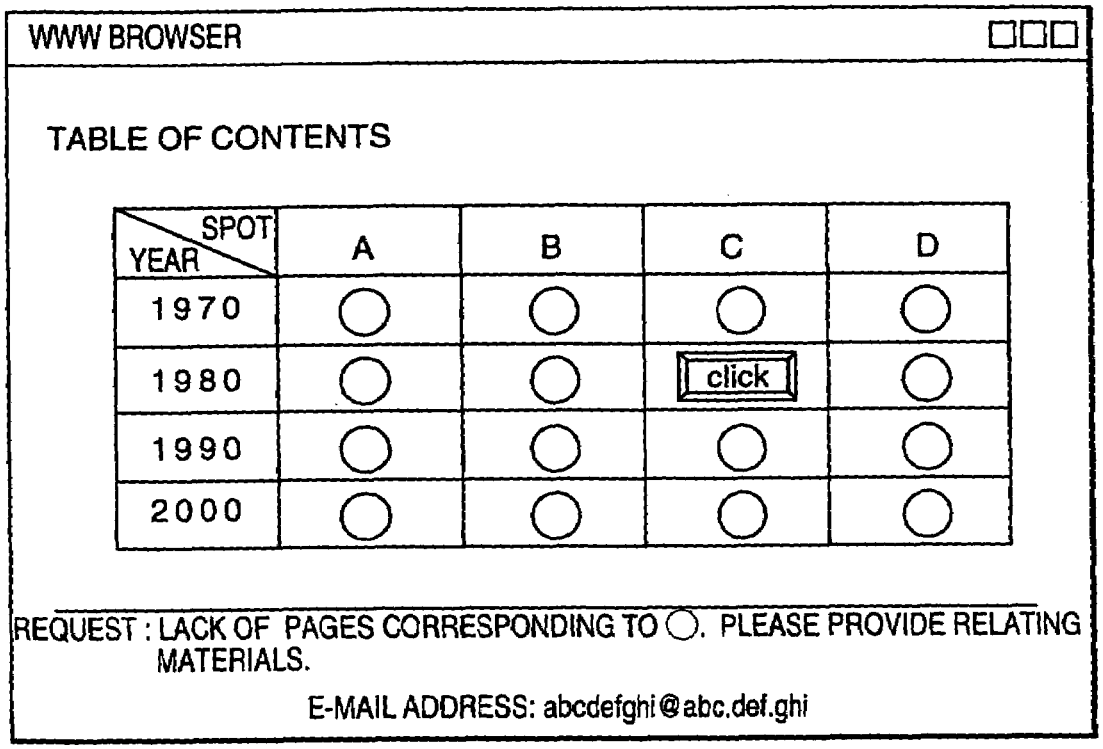
FIGS. 9A and 9B show the incomplete multimedia contents presented by the WWW browser.
Figure 9B:
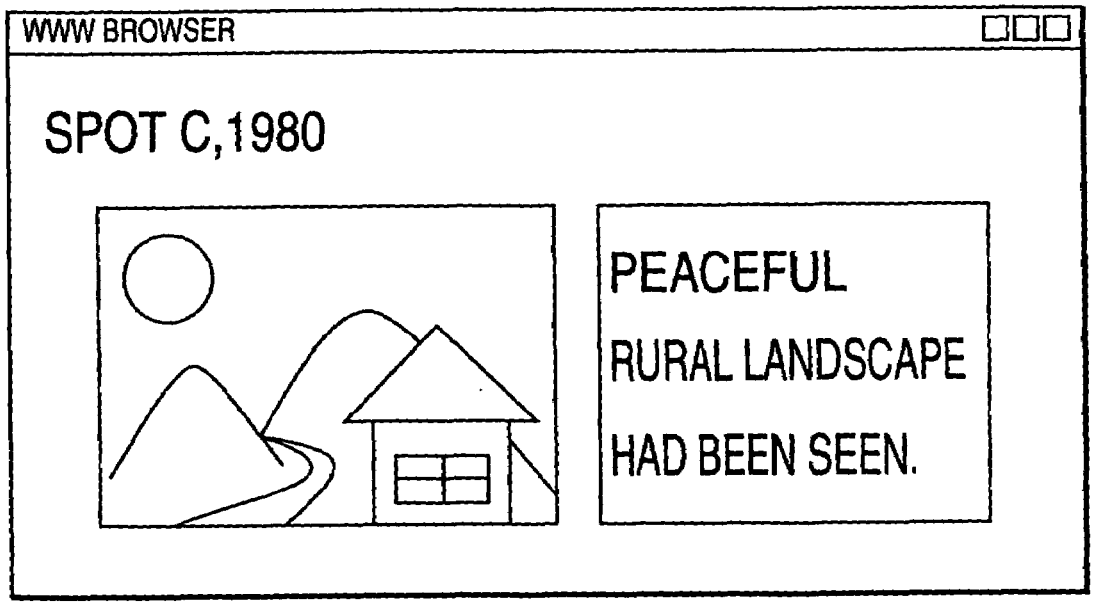

Each of the client can watch the table of the contents by the use of a WWW browser and can watch the content page by the clicking the link button. For example, the WWW browser shows the table of the contents and the content page as illustrated in FIGS. 9A and 9B, respectively.

The connecting unit 311 further checks the supplier information memory 314. If an electronic mail address is included in the supplier information memorized is the supplier information memory 314, the presenting unit 311 send an email to request the lacking multimedia data.

Figure 10:
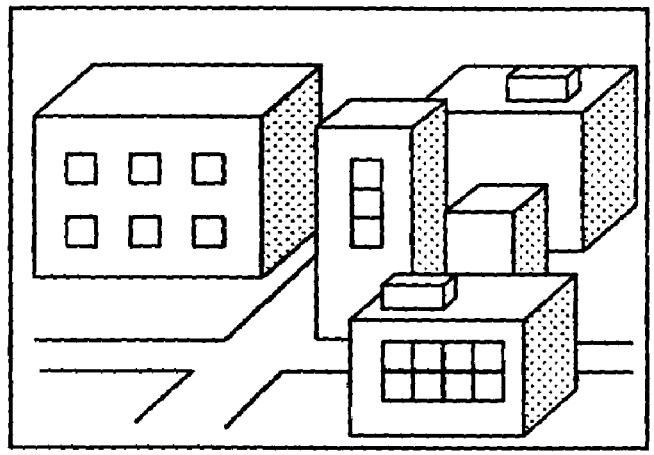
FIG. 10 shows an example of an electronic mail sent from a client.

Now, it is assumed that one of the clients sent an email as shown in FIG. 10 to the scenario editing device.

The additional data receiving unit 312 receives the email and analyse the email. The additional data receiving unit 312 picks out a picture (i.e. an image data set) and its caption (i.e. a text data set) from the email and recognizes that the picture shows a landscape of the spot A in 1990. The picture and the caption is supplied to the scenario supplementing unit 313 together with the recognized information. Moreover the additional data receiving unit 312 picks out the supplier information, receiving data information, source address of the email and store these information into the supplier information memory 314. The supplier information memory 314 memorizes the supplier information as shown in FIG. 11.

When the scenario supplementing unit 313 receives the additional data sets representing the picture and the caption, it refers to the scenario basic rule memorized in the scenario rule memory 307 to produce the additional scenario corresponding to the additional data sets. The scenario supplementing unit 313 further changes the scenario memorized in the scenario memory 305 to incorporate the additional scenario to the memorized scenario. That is, the scenario supplementing unit 313 produces a data table 003 as shown in FIG. 12D and changes the main table as shown in FIG. 12A according to the scenario basic rules of "MAKE A CONTENT PAGE EVERY COMBINATION OF SPOT AND YEAR" and "FOLLOW THE PAGE OF "SPOT C, 1980"". Then the scenario supplementing unit 313 changes the data table 001 according to the scenario basic rules of "CLASSIFY RECEIVED DATA ACCORDING TO YEARS OF 1970, 1960, 1990, AND 2000", "CLASSIFY RECEIVED DATA ACCORDING TO SPOTS OF A, B, C, AND D", and "LOCATE A BUTTON ACCORDING TO EQUATION F" as shown in FIG. 12B to locate a link button relating to the content page of "SPOT A, 1990" on the page of "TABLE OF CONTENTS". As shown in FIG. 12C, the data table 002 corresponding to the content page of "SPOT C, 1980" is not changed by the scenario supplementing unit 313 in this event.

When the scenario memorized in the scenario memory 305 is renewed by the scenario supplementing unit 313, the scenario analyzing unit 308 analyses the renewed scenario and renew the scenario complete degree information memorized in the scenario complete degree memory 309. The renewed scenario complete degree information is shown in FIG. 13. Compared with FIG. 8, "SPOT A, 1990" is erased from the column of the lacking page and the scenario complete rate is changed to 2/16 in FIG. 13.

When the scenario and the scenario complete degree information arc renewed, the scenario converting unit converts the renewed scenario into a renewed exhibiting electronic document. The contents presenting unit 311 upload the renewed exhibiting electronic document and the multimedia data to the www server.

The WWW browse can show the renewed table of the contents as shown in FIG. 14A. If the link button relating to the content page of "SPOT A, 1990" is clicked, the WWW browser shows the content page of "SPOT A, 1990" as shown in FIG. 14B. Additionally, if the scenario basic rule includes a rule of "DISPLAY NAME OF SUPPLIER", the content page of the "SPOT A, 1990" includes a sentence of "SUPPLIED BY NICHIDEN TARO". Needless to say, when the link button relating to the content page of "SPOT C, 1980" is clicked, the WWW browser shows the content page of "SPOT C, 1980" as shown in FIG. 9H.

As mentioned above, the scenario editing device automatically renews the scenario memorized in scenario memory 305 whenever additional data sate are supplied from the clients. In addition, the scenario editing device snows the multimedia contents exhibiting on the computer network whenever the scenario is renewed. Thus the scenario editing device automatically enriches the multimedia contents to achieve the complete state of the multimedia contents.

Since the scenario basic rule has no completion condition in above description, the scenario editing device continues the operation forever. Therefore, it is necessary to add a rule for stopping the operation of the scenario editing device to the scenario basic rule memorized in the scenario rule memory 307. The additional rule is as, for example, "If once the content page is made, don't renew the content page.". In this case, the scenario supplementing unit 313 rejects the additional multimedia data relating to the content page which is already made.

While this invention has thus for been described in conjunction with the preferred embodiment thereof, it will readily be possible for those skilled in the art to put this invention into practice in various other manners. For example, the input/output control unit 303, the scenario editing unit 304, the scenario rule editing unit 306, the scenario analyzing unit 308, the scenario converting unit 310, the contents presenting unit 311, the additional dares receiving unit 312, and the scenario supplementing unit 313 are realized by a software or a computer program. The computer program secures memory areas for the scenario memory 305, the scenario rule memory 301, the scenario complete degree memory 309, and the supplier information memory 314 in a memory device (not shown) of the personal computer. Though the computer program is generally recorded in a recording medium such an a CD-ROM a flexible magnetic recording medium, or a semiconductor memory, it may be memorized in a server such as the WWW server.

Moreover, the output device may be used for presenting the multimedia contents to the clients. In this case, the connecting unit 311 may be a memory substituting for the WWW server.

What is claimed is:

1. A scenario editing device for editing a scenario of multimedia contents which include a plurality of materials represented by data sets, said scenario editing device comprising:
   a scenario memory for memorizing the scenario,
   a scenario rule memory for memorizing a scenario basic rule which defines specifications of a complete state of the multimedia contents,
   a receiving unit for receiving an additional data set which represents an additional material necessary to complete the multimedia contents,
   a scenario supplementing unit connected to said scenario memory, said scenario rule memory, and said receiving unit for supplementing the scenario according to the scenario basic rule so that the additional material is included in the multimedia contents to make the multimedia contents approach the complete state;
   a scenario converting unit connected to said scenario memory and said scenario rule memory for converting the scenario memorized in said scenario memory with the scenario basic rule into an exhibiting electronic document which is used for exhibiting the multimedia contents; and
   a scenario analyzing unit connected to said scenario memory, said scenario rule memory, and said scenario converting unit for analyzing the scenario memorized in the scenario memory with the scenario basic rule memorized in the scenario rule memory to produce a lacking data list and to supply the lacking data list for said scenario converting unit, said scenario converting unit including the lacking data list with the multimedia contents as one of the materials.

2. A scenario editing device as claimed in claim 1, further comprising a connecting unit connected to the scenario converting unit for connecting the scenario converting unit to a computer network to exhibit the multimedia contents on said computer network.

3. A scenario editing device as claimed in claim 2, wherein said receiving unit is connected to said computer network to receive the additional data set through said computer network.

4. A scenario editing device as claimed in claim 1, further comprising a scenario completion degree information memory which is connected between said scenario analyzing unit and said scenario converting unit to memorize the lacking data list as completion degree information, wherein said scenario analyzing unit renews the scenario completion degree information whenever said receiving unit receives the additional data set.

5. A scenario editing device as claimed in claim 1, further comprising a scenario editing unit connected to said scenario memory for producing and editing the scenario.

6. A scenario editing device as claimed in claim 1, further comprising a scenario basic rule editing unit connected to said scenario rule memory for producing and editing the scenario basic rule.

7. A scenario editing device for editing a scenario of multimedia contents which are presented to a client through a computer network and which include a plurality of materials represented by data sets, said scenario editing device comprising:
   a scenario memory for memorizing the scenario,
   presenting means connected to said scenario memory and said computer network for presenting the multimedia contents to the client by the use of the scenario memorized in scenario memory,
   a receiving unit for receiving an additional data set which is supplied from the client and which represents an additional material,
   a scenario supplementing unit connected to said scenario memory and said receiving unit for supplementing the scenario memorized in said scenario memory so that the additional material represented by the additional data set is included in the multimedia contents,
   a scenario rule memory connected to said scenario supplementing unit for memorizing a scenario basic rule defining specifications of a complete state of the multimedia contents, wherein said scenario supplementing unit supplements the scenario according to the scenario basic rule; and
   a scenario analyzing unit connected to said scenario memory, said scenario rule memory, and said presenting means for analyzing the scenario with the scenario basic rule memorized in the scenario rule memory to produce a lacking data list and to supply the lacking data list for said presenting means, said presenting means presenting the lacking data list as one of the materials of the multimedia contents.

8. A scenario editing device as claimed in claim 7, wherein said presenting means has a scenario converting unit and a connecting unit, said scenario converting unit connected to said scenario memory for converting the scenario memorized in said scenario memory into an exhibiting electronic document, and said connecting unit connected to said scenario converting unit for connecting said scenario converting unit to said computer network to present the multimedia contents to the client through said computer network.

9. A scenario editing device as claimed in claim 7, wherein said receiving unit is connected to said computer network to receive the additional data set from the client through said computer network.

10. A scenario editing device as claimed in claim 7, said scenario editing device further comprising a scenario completion degree information memory which is connected between said scenario analyzing unit and said presenting means to memorize the lacking data list as completion degree information, wherein said scenario analyzing unit renews the scenario completion degree information whenever said receiving unit receives the additional data set.

11. A scenario editing device as claimed in claim 7, further comprising a scenario editing unit connected to said scenario memory for producing and editing the scenario.

12. A scenario editing device as claimed in claim 7, further comprising a scenario basic rule editing unit connected to said scenario rule memory for producing and editing the scenario basic rule.

13. A recording medium in which a computer readable program is recorded, said computer readable program comprising the steps of:

memorizing, in a scenario memory, a scenario of multimedia contents which include a plurality of materials represented by data sets, memorizing, in a scenario rule memory, a scenario basic rule which defines specifications of a complete state of the multimedia contents, receiving, by a receiving unit, an additional data set which represents an additional material necessary to complete the multimedia contents, supplementing, at a scenario supplementing unit, the scenario according to the scenario basic rule so that the additional material is included in the multimedia contents to make the multimedia contents approach the complete state;

converting, at a scenario converting unit, the scenario memorized in said scenario memory with the scenario basic rule into an exhibiting electronic document which is used for exhibiting the multimedia contents;

analyzing the scenario memorized in the scenario memory with the scenario basic rule memorized in the scenario rule memory to produce a lacking data list and to supply the lacking data list for said scenario converting unit, and including the lacking data list with the multimedia contents as one of the materials all said scenario converting unit.

14. A recording medium as claimed in claim 13, wherein said program further comprises the step of exhibiting the electronic document on a computer network.

15. A recording medium as claimed in claim 14, wherein the receiving unit receives the additional data set through said computer network at the receiving step.

16. A recording medium as claimed in claim 13, wherein said program further comprises the steps of:

memorizing the lacking data list as completion degree information in a scenario completion degree information memory, and renewing, at said scenario analyzing unit, the scenario completion degree information whenever said receiving unit receives the additional data set.

17. A recording medium as claimed in claim 13, wherein the program further comprises the step of producing the scenario at a scenario editing unit to memorize the scenario into the scenario memory.

18. A recording medium as claimed in claim 13, wherein the program further comprises the step of producing the scenario basic rule at a scenario rule editing unit to memorize the scenario basic rule into the scenario rule memory.

* * * * *